(12) United States Patent
Huang

(10) Patent No.: US 6,568,496 B1
(45) Date of Patent: May 27, 2003

(54) ELECTROMOTIVE MOTORCYCLE ARRANGED WITH POWER SYSTEM USING FUEL CELL

(76) Inventor: Yung Ho Huang, 235 Chung-Ho Box, 8-24 Taipei (TW)

(*) Notice: Subject to any disclaimer, the term of this patent is extended or adjusted under 35 U.S.C. 154(b) by 0 days.

(21) Appl. No.: 09/988,484

(22) Filed: Nov. 20, 2001

(51) Int. Cl.[7] ............................. B62D 61/02; B62M 7/00
(52) U.S. Cl. ...................................... 180/220; 180/65.3
(58) Field of Search .............................. 180/65.1, 65.3, 180/220, 219, 229, 180, 181

(56) References Cited

U.S. PATENT DOCUMENTS

| | | | | |
|---|---|---|---|---|
| 4,842,091 A | * | 6/1989 | Badsey ........................ | 180/219 |
| 5,396,970 A | * | 3/1995 | Ono ............................. | 180/220 |
| 5,613,569 A | * | 3/1997 | Sugioka et al. ............. | 180/68.5 |
| 5,848,660 A | * | 12/1998 | McGreen .................... | 180/206 |
| 6,326,765 B1 | * | 12/2001 | Hughes et al. .............. | 320/104 |
| 6,347,681 B1 | * | 2/2002 | Patmont et al. ............. | 180/220 |

FOREIGN PATENT DOCUMENTS

| | | | |
|---|---|---|---|
| JP | 2001--354179 | * | 12/2001 |
| JP | 2002--37167 | * | 2/2002 |
| JP | 2002--42843 | * | 2/2002 |
| JP | 2002--46679 | * | 2/2002 |

* cited by examiner

Primary Examiner—Avraham Lerner

(57) ABSTRACT

An electromotive motorcycle arranged with a power system using a fuel cell is disclosed. The power system includes a fuel cell, a cool water box, and a hydrogen storage device. The fuel cell is arranged on a framework. The cool water box is arranged at a front area of the framework. The hydrogen storage device has a container body and a plurality of hydrogen storage cans. The interior of the container body has a plurality of joints for being connected with the hydrogen storage cans, a guide tube and control elements. A temperature retainer is disposed in the container body. Thereby, hot water from the fuel cell is firstly guided to the temperature retainer in the container body before being guided into the cool water box. Therefore, the power system using a fuel cell is arranged on the electromotive motorcycle so that the electromotive motorcycle is used in an optimum condition.

1 Claim, 4 Drawing Sheets

ELECTROMOTIVE MOTORCYCLE ARRANGED WITH POWER SYSTEM USING FUEL CELL

FIELD OF THE INVENTION

The present invention relates to an electromotive motorcycle, and especially to an electromotive motorcycle arranged with a power system using a fuel cell, so that the electromotive motorcycle can be used in an optimum condition.

BACKGROUND OF THE INVENTION

Electromotive motorcycles have the advantages of saving power and low noises, and therefore, the electromotive motorcycles will become more and more popular and used to replace motorcycle using gasoline. The prior electromotive motorcycles use charging type battery as a power source. This kind of batteries have finite ability for storing energy. Therefore, the electromotive motorcycles using this kind of battery travel only a finite distance. They must be charged frequently. Thus, they cannot be used widely.

To resolve above problem, fuel cells are developed for replacing the charging type battery. The fuel cells use hydrogen as fuel. Power is generated by hydrogen to contact oxygen through catalyst. Therefore, a further hydrogen storage device is necessary. Moreover, the fuel cell will generate heat and thus cool water device is necessary for maintaining a normal working temperature. Furthermore, to be convenient to update the hydrogen, it is preferable to use metal hydrogen storage cans to replace the prior hydrogen storage device. This is a way for resolving the problem in the prior art, while this induces another problem, that is, how to arrange these device in a preferably way so as to maintain a beautiful outlook and provide a safety device to the drivers. Thereby, hydrogen can be updated easily and conveniently, and thus, electromotive motorcycles can be used widely.

SUMMARY OF THE INVENTION

Accordingly, the primary object of the present invention is to provide an electromotive motorcycle arranged with a power system using a fuel cell which is arranged properly on the body of an electromotive motorcycle so that the electromotive motorcycle can be used in an optimum condition. The integrality and beauty of the electromotive motorcycle will not be destroyed. Furthermore, the center of the gravitation can be reduced and the hydrogen storage cans may be updated conveniently.

To achieve the object, the present invention provides an electromotive motorcycle arranged with a power system using a fuel cell. The power system includes a fuel cell, a cool water box, and a hydrogen storage device. The fuel cell is arranged on the framework. The cool water box is arranged at a front area of the framework. The hydrogen storage device has a container body and a plurality of hydrogen storage cans. The interior of the container body has a plurality of joints for being connected with the hydrogen storage cans, a guide tube and control elements. A temperature retainer is disposed in the container body. Thereby, hot water from the fuel cell is firstly guided to the temperature retainer in the container body before being guided into the cool water box. Therefore, the power system using a fuel cell is arranged on the electromotive motorcycle so that the electromotive motorcycle is used in an optimum condition.

The various objects and advantages of the present invention will be more readily understood from the following detailed description when read in conjunction with the appended drawing.

DETAILED DESCRIPTION OF THE PREFERRED EMBODIMENTS

Figure 1:
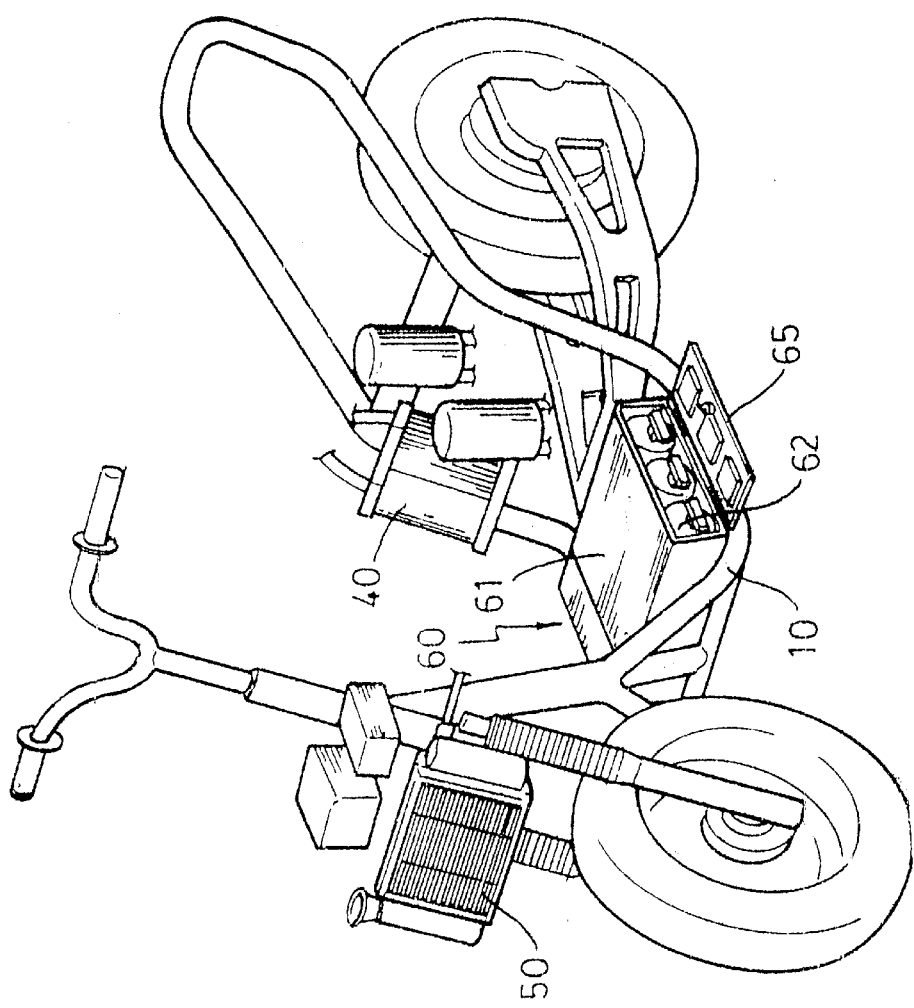
FIG. 1 is a perspective view of the present invention.

Referring to FIG. 1, in the present invention, a power system using a fuel cell is arranged on an electromotive motorcycle. The electromotive motorcycle is for example a scooter, namely, it has a framework 10 enclosing by a housing 20. The framework 10 has a driven device with an electromotive motor 30 as a power supplying device and other necessary control devices.

The power system includes a fuel cell 40, a cool water box 50, and a hydrogen storage device 60, and other devices. In the present invention, the fuel cell 40, cool water box 50 and hydrogen storage device 60 are properly arranged on the framework.

Figure 2:
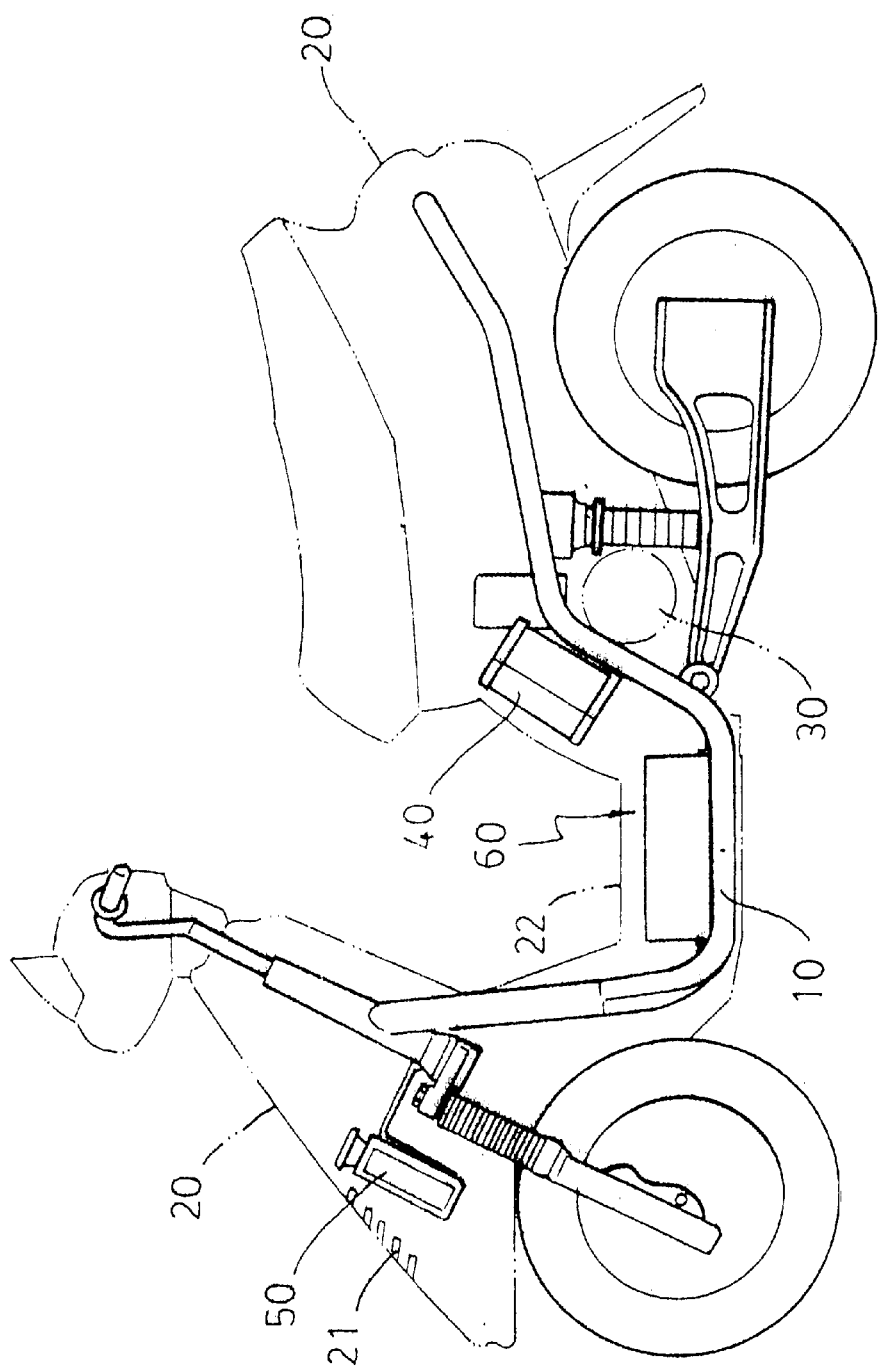
FIG. 2 is a structural view of the present invention.

The fuel cell 40 (referring to FIGS. 1 and 2) is arranged near the framework of an electromotive motor 30 for supplying power to an electromotive motor 30.

The cool water box 50 (referring to FIGS. 1 and 2) is arranged at the front area of the framework 10. The housing 20 has air inlet holes 21 at a position near the cool water box 50. Thereby, as the electromotive motorcycle moves, air will flow into the holes 21 for cooling the cool water box 50.

Figure 3:
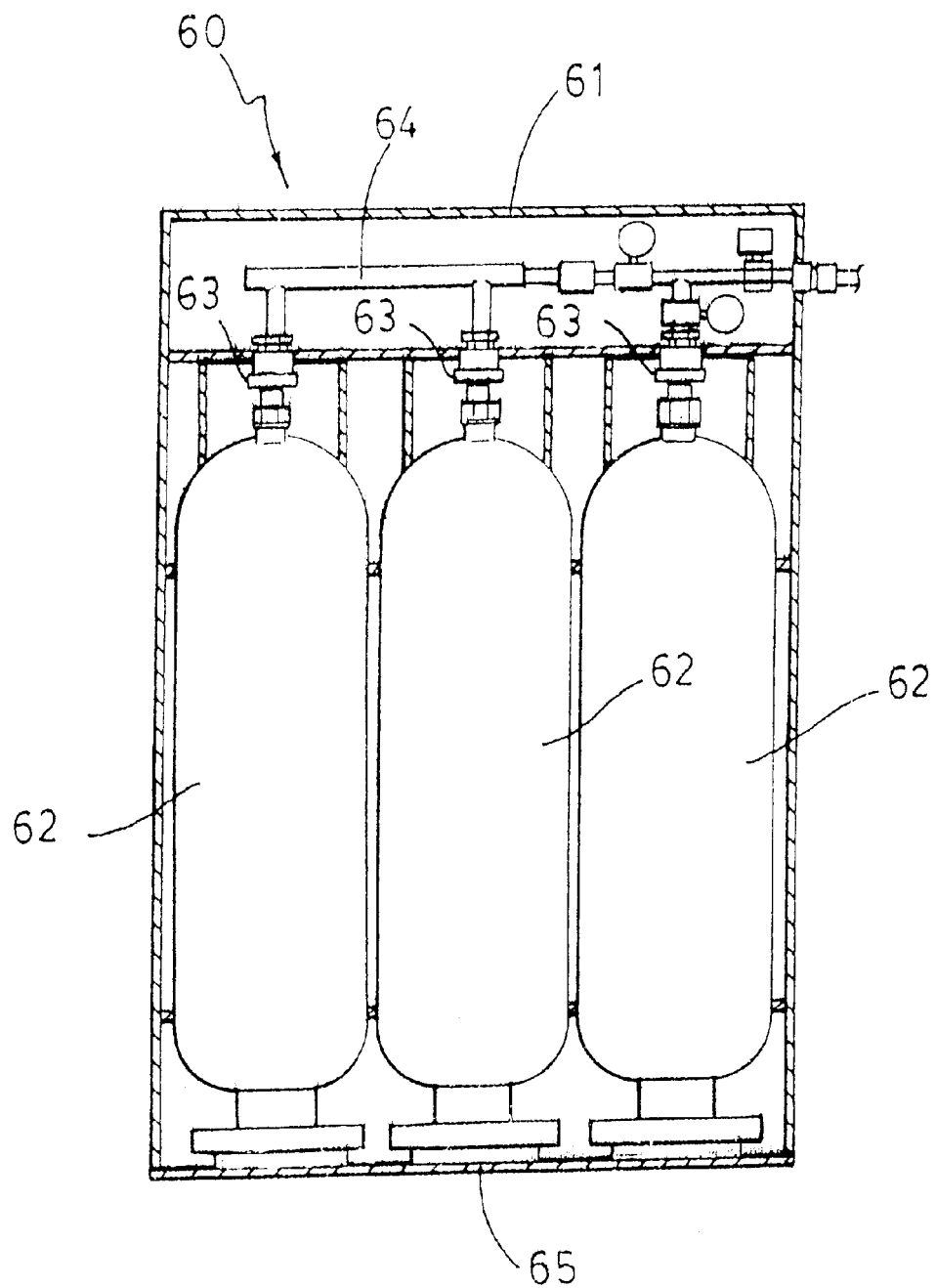
FIG. 3 is an elevational cross section view of the hydrogen storage device of the present invention.
Figure 4:
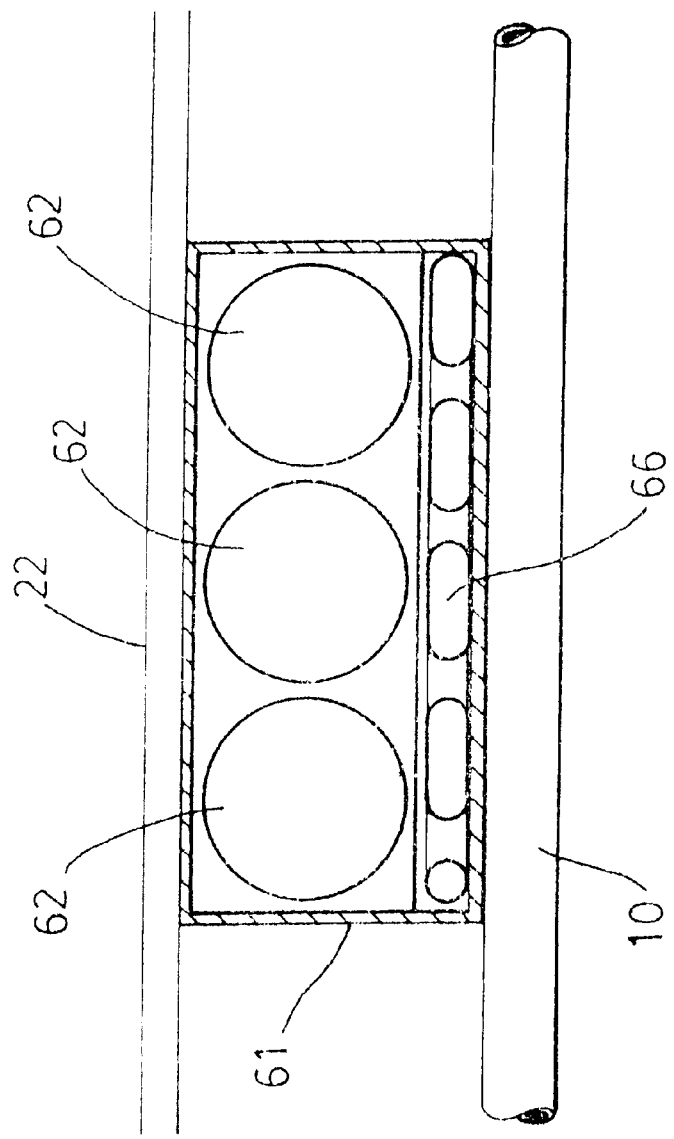
FIG. 4 is a lateral cross section view of the hydrogen storage device of the present invention.

The hydrogen storage device 60 (referring to FIGS. 1 and 2) is arranged below the pedals 22 of the housing 20 and above the framework 10. The hydrogen storage device 60 has a container body 61 and a plurality of hydrogen storage cans 62 (referring to FIGS. 3 and 4). The container body 61 is fixed below the pedals 22 of the housing 20 and above the framework 10. The interior of the container body 61 has a plurality of joints 63 for being connected with the hydrogen storage cans 62, a guide tube 64 and other control elements. One side of the body has an open-able surface for updating the hydrogen storage cans 62. A door plate 65 is formed on that surface. The door plate is exactly at one lateral side of the electromotive motorcycle body. Thereby, the hydrogen storage cans can be updated conveniently. A temperature retainer 66 having a snake—like shape is disposed in the container body 61. One end of the temperature retainer 66 is connected to a hot water outlet end of the fuel cell 40, and another end thereof is connected to the hot water inlet end of the cool water box 50. The hot water from the fuel cell 40 is firstly guided to the temperature retainer 66 in the container body 61 before being guided into the cool water box 50 for cooling. Therefore, the container body 61 may maintain a proper temperature which is necessary as the hydrogen storage cans 62 releases hydrogen gas.

Therefore, in the present invention, the power system using a fuel cell includes a fuel cell 40, a cool water box 50, and a hydrogen storage device 60 which are arranged properly on the body of an electromotive motorcycle so that the electromotive motorcycle can be used in an optimum condition. Especially, the container body 61 is fixed below the pedals 22 of the housing 20 and above the framework 10. The integrality and beauty of the electromotive motorcycle will not be destroyed. Furthermore, the center of the gravitation can be lowered and the framework 10 below the pedal 22 is utilized to protect the hydrogen storage cans 62 so that it can be used conveniently.

In summary, in the present invention, the power system using a fuel cell is arranged properly on the body of an electromotive motorcycle so that the electromotive motorcycle can be used in an optimum condition. The integrality and beauty of the electromotive motorcycle will not be destroyed. Furthermore, the center of the gravitation can be lowered. Furthermore, the hydrogen storage cans may be updated conveniently.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electromotive motorcycle arranged with a power system using a fuel cell; said electromotive motorcycle being a scooter-like motorcycle having a framework; said framework being enclosed by a housing; said housing having a pedal; said framework being attached with a driven device which is an electromotive motor, control devices and a power system; said power system including a fuel cell, a cool water box, and a hydrogen storage device; wherein said fuel cell is arranged on said framework near said electromotive motor for supplying power to said electromotive motor;

said cool water box is arranged at a front area of said framework; and said housing has air inlet holes at a position near said cool water box; thereby, air flows through the inlet holes to the cool water box; and said hydrogen storage device is arranged below said pedal of said housing and above said framework; said hydrogen storage device has a container body and a plurality of hydrogen storage cans; said container body is fixed below said pedal of said housing and above said framework; an interior of said container body has a plurality of joints for being connected with said hydrogen storage cans, a guide tube and control elements; one lateral side of said container body has an open-able surface for updating said hydrogen storage cans; a door plate is formed on said open-able surface; said door plate is exactly at one lateral side of said electromotive motorcycle for updating said hydrogen storage cans; a temperature retainer having a snake—like shape is disposed in said container body; one end of said temperature retainer is connected to a hot water outlet end of said fuel cell, and another end thereof is connected to a hot water inlet end of said cool water box; hot water from said fuel cell is firstly guided to said temperature retainer in said container body before being guided into said cool water box for cooling;

therefore, said power system using a fuel cell is arranged on said electromotive motorcycle so that said electromotive motorcycle is used in an optimum condition.

\* \* \* \* \*